US006752192B2

(12) United States Patent
Francis et al.

(10) Patent No.: US 6,752,192 B2
(45) Date of Patent: Jun. 22, 2004

(54) LABEL RELEASE AND SEPARATION SYSTEM

(75) Inventors: Evan Francis, Vancouver (CA); Greg Christoffersen, Calgary (CA); Tony Moucachen, Calgary (CA)

(73) Assignee: Merlin Plastics Alberta Inc., Calgary (CA)

( * ) Notice: Subject to any disclaimer, the term of this patent is extended or adjusted under 35 U.S.C. 154(b) by 29 days.

(21) Appl. No.: 10/116,040

(22) Filed: Apr. 5, 2002

(65) Prior Publication Data

US 2003/0070754 A1 Apr. 17, 2003

(30) Foreign Application Priority Data

Oct. 16, 2001 (CA) .............................................. 2359166

(51) Int. Cl.[7] .............................................. B32B 35/00
(52) U.S. Cl. .................... 156/584; 156/344; 134/25.4; 134/32; 134/33; 134/42; 134/65; 134/132; 134/189
(58) Field of Search ................................ 156/344, 584; 134/19, 25.1, 25.2, 25.4, 30, 32, 33, 37, 42, 65, 132, 189, 198

(56) References Cited

U.S. PATENT DOCUMENTS

| 3,534,428 A | | 10/1970 | Pugh et al. | |
| 3,754,559 A | * | 8/1973 | Seiwert | 134/65 |
| 3,817,375 A | | 6/1974 | Herkes | |
| 4,033,804 A | * | 7/1977 | Baldyga | 156/84 |
| 4,209,344 A | * | 6/1980 | Simon et al. | 134/23 |
| 4,322,252 A | * | 3/1982 | Plumb | 134/12 |
| 4,599,131 A | * | 7/1986 | Matuszak | 156/584 |
| 4,611,612 A | * | 9/1986 | Obie et al. | 134/65 |
| 4,778,116 A | | 10/1988 | Mayberry | |
| 4,830,699 A | | 5/1989 | Burlet et al. | |
| 5,133,124 A | * | 7/1992 | Burroughs | 29/403.1 |
| 5,185,041 A | * | 2/1993 | Anderson et al. | 134/25.1 |
| 5,203,359 A | | 4/1993 | Fesmire et al. | |
| 5,375,778 A | * | 12/1994 | Lundquist | 241/20 |
| 5,390,799 A | | 2/1995 | Previero | |
| 6,131,509 A | * | 10/2000 | Davis | 100/39 |
| 6,568,410 B1 | * | 5/2003 | Teruggi et al. | 134/120 |

FOREIGN PATENT DOCUMENTS

| BE | 881 831 | 8/1980 |
| WO | WO 99 55508 | 11/1999 |

* cited by examiner

Primary Examiner—Mark A. Osele
(74) Attorney, Agent, or Firm—Thomas E. Malyszko

(57) ABSTRACT

A system for releasing and separating labels from containers has a releaser for mixing the containers with introduced fluids and for providing the containers with a sufficient retention time and agitation to clean the containers and release the labels therefrom. The system further includes a separator for receiving the containers and labels from said releaser. The separator has an inclined base with a plurality of counter-rotating rollers adapted to urge the labels and introduced fluid away from said containers. The rollers are spaced to encourage some of the containers to become wedged therebetween to enhance performance of the separator.

49 Claims, 5 Drawing Sheets

LABEL RELEASE AND SEPARATION SYSTEM

FIELD OF THE INVENTION

The present invention relates to a system for removing labels from containers in general, and in particular for washing plastic bottles and for releasing and separating labels and other contaminants from plastic bottles for further use and recycling.

BACKGROUND OF THE INVENTION

Commercial recycling of post consumer plastic bottle and like containers typically involves the removal of labels from the bottles before the bottles can be further processed for re-use. Labeled bottles usually arrive at a processing facility in the form of large compacted bales that contain many contaminants, such as caps, cap rings, foil and dirt. The labels, whether made of plastic, paper or other material, are almost always glued to the bottles. The delabeling process typically has two general stages: the first is the loosening and/or releasing of labels from a stream of bottles; and the second is the separation and removal of the labels from the stream of bottles.

While the delabeling process may be done by hand, this is an extremely inefficient and expensive option in a large volume commercial operation. Hence, mechanical delabeling processes have been developed, but the label separation efficiencies remain fairly low. First, there is room for improvement in the release stage to decrease the amount of fluid (usually water) and energy required for label liberation. Second, the most notable problem remains the inefficiencies in separating the released labels from the bottle stream.

Many different processes have been developed, such as those employing high-pressure jets of water or pocketed conveyors for holding and moving individual bottles. While such methods may work with a uniform stream of solid bottles of a specific shape, such as glass bottles, they can not effectively handle a stream of plastic bottles of various shapes and sizes, many of which are crushed or otherwise deformed and damaged.

Another currently employed process which targets plastic bottles typically employs a high rpm (revolutions per minute) drum for aggressively removing labels from the bottles, and some kind of perforated screen for label separation. Such screens sometimes resemble ones used to screen gravel or dirt, namely a long cylindrical shell with perforations thereabout, but designed to have separated labels exit through the perforations and to have the delabeled bottles exit at the far end of the shell. A problem with such perforated shells is that even with short use, the perforations get plugged with labels and plastic bottles, hence requiring either frequent cleaning (which is not practical) or another (secondary) stage of label separation, such as hand sorting of the exiting stream of bottles and labels.

Yet another process employs counter-rotating shakers or shaker tables for label removal, but there is a relatively high loss of bottles into the removed label stream, particularly with those bottles where the labels remain attached and can't be shaken off. Hence, some of the delabeling and removal must usually be supplemented by hand. Further, water removal from the bottles is generally inadequate with such systems.

What is therefore desired is a novel label removal and separation system with a high efficiency for label separation from plastic bottles of various shapes and sizes. The label release stage should provide for label liberation with the use of steam and a minimum of hot water. Alternately, steam alone should be used to minimize or eliminate the introduction of water into the bottles, and hence to minimize or eliminate the need for subsequent water extraction from the bottles. A drum rotated at low rpm should be employed to agitate the bottles, and to reduce wear and tear on machinery and operating costs. A distinct label separation stage should be provided after the label release stage for effective and efficient separation of labels from the bottles. The separation stage should employ a series of rollers, rather than a perforated drum or shaker, to urge the labels away from the stream of bottles and labels exiting the removal stage. Preferably the series of rollers should allow the labels to be discarded below the rollers and the delabeled bottles to be substantially de-watered and transported over the rollers for further processing.

SUMMARY OF THE PRESENT INVENTION

In a first aspect the invention provides a system for releasing and separating labels from containers comprising a release portion for mixing the containers with an introduced fluid and for providing the containers with a sufficient retention time and agitation to clean the containers and release the labels therefrom; and, a separation portion for receiving the containers and labels from the release portion, the separation portion comprising a plurality of rollers adapted to urge the labels and introduced fluid away from the containers.

In a second aspect the invention provides an apparatus having a releaser and a separator for removing labels from a stream of containers wherein the releaser comprises a rotatable hollow drum member housing a helical screw member for urging the containers through said drum member and for mixing said containers with fluids introduced therein, said drum member being adapted to provide said containers with adequate retention time and agitation to clean said containers of contaminants and release said labels therefrom.

In a third aspect the invention provides an apparatus having a releaser and a separator for removing labels and fluids from a stream of containers wherein the separator comprises a plurality of rollers adapted to urge the labels and fluids away from the containers, the rollers being driven in a counter-rotating manner to the prevailing movement of the containers along the rollers.

In a fourth aspect the invention provides a method for removing labels from containers comprising the following steps:

feeding a plurality of the containers into an upstream end of a releaser;

introducing fluids into the releaser;

maintaining a temperature within the releaser sufficient for cleaning the containers and for urging the release of the labels therefrom;

revolving the releaser to propel the containers and labels toward a downstream end of the releaser;

oscillating the releaser to provide sufficient retention time and agitation for washing the containers and promoting label release;

discharging the containers, labels and fluids from the downstream end of the releaser toward a first end of a separator;

passing the discharged containers and labels onto a plurality of rollers of the separator;

urging the containers to travel by gravity over the rollers by maintaining the separator inclined;

driving the rollers in a counter-rotating manner to the prevailing travel of the containers along the rollers for urging the labels away from the containers; and, discharging the labels from the separator in a first direction and discharging the containers from the separator in a second direction for further processing.

BRIEF DESCRIPTION OF THE DRAWING FIGURES

Embodiments of the invention will now be described, by way of example only, with reference to the accompanying drawings, wherein.

Figure 1:
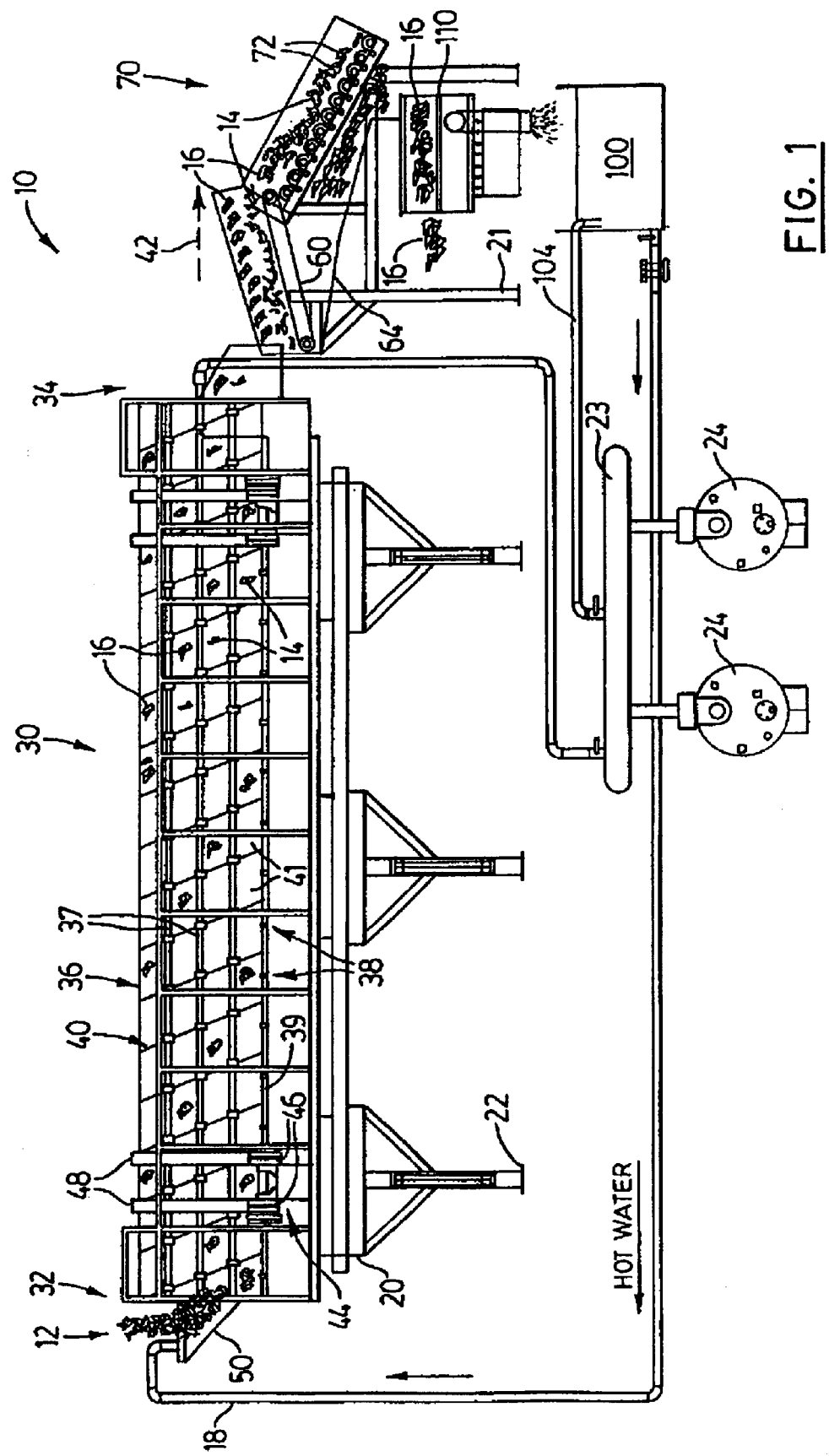
FIG. 1 is a transparent elevational view of a label release and separation system according to a preferred embodiment of the present invention, namely a label separating apparatus downstream of a washing (i.e. label release) apparatus.

| LIST OF REFERENCE NUMERALS IN DRAWINGS | |
|---|---|
| 10 | label release and separation system |
| 12 | mixture of labeled bottles and contaminants |
| 14 | delabeled bottles |
| 16 | labels |
| 18 | hot water piping |
| 20 | support structure/frame |
| 21 | second support structure/frame |
| 22 | floor |
| 23 | steam header |
| 24 | steam boiler(s) |
| 30 | washer/label releaser |
| 32 | inlet of 30 |
| 34 | outlet of 30 |
| 36 | drum |
| 37 | corrugations inside 36 |
| 38 | steam injection points |
| 39 | steam supply pipe |
| 40 | helical screw inside 30 |
| 41 | chamber inside 30 |
| 42 | longitudinal axis of 36 |
| 43a | 360 degree rotation |
| 43b, c | 45 degree oscillation |
| 44 | rotation mechanism for 36 |
| 46 | wheels |
| 48 | tracks on exterior of 36 |
| 50 | chute |
| 60 | first conveyor |
| 62 | expelled water |
| 64 | plate member |
| 70 | label separator |
| 71 | counter-rotation |
| 72 | rollers |
| 73 | outer surface of 72 |
| 74 | first/upper end of 70 |

-continued

| LIST OF REFERENCE NUMERALS IN DRAWINGS | |
|---|---|
| 75 | second/lower end of 70 |
| 76 | frame |
| 78 | bearing mechanisms for 72 |
| 79 | drive mechanism for 70 |
| 79a | drive motor for 79 |
| 80 | first gap |
| 82 | rod |
| 84 | second gap |
| 86 | bars |
| 87 | edges of 86 |
| 90 | optional second label separator |
| 100 | hot water tank |
| 110 | vibrating filter |
| 112 | open top of 110 |
| 114 | screen |
| 116 | chamber |
| 118 | vibrating mechanism |
| 119 | exit port |
| 120 | second conveyor |

DESCRIPTION OF PREFERRED EMBODIMENTS

The figures show a system according to the present invention (generally designated by reference numeral 10) for releasing and separating labels 16 from post-consumer plastic bottles 12, namely "raw" or labeled bottles. The system 10 has two primary components, namely a washing apparatus 30 (also referred to as a "washer" or "label releaser") followed at its downstream end 34, or outlet, by a label separating and removing apparatus 70 (also referred to herein as a "label separator" or "separator"). In general, the system functions by introducing a mixture of raw labeled bottles and other contaminants, indicated by 12, and some recycled hot water to an upstream end 32, or inlet, of the washer 30. The drum 36 of the washer is rotated in a pre-set manner to agitate the bottles and to mix them with steam that is injected at selected supply points 38 along the drum. An archimedian-type screw fixed within the drum urges the labeled bottles 12 through the drum. Most of the bottles will have had their labels released by the time the mixture of water/steam, labels 16, delabeled bottles 14 and other contaminants is expelled from the outlet 34 and conveyed onto the inclined label separator 70. Water from the mixture is channeled by gravity to a hot water holding tank 100 for re-circulation and re-use in the system. As shown in FIG. 1, the mixture is directed over a series of counter-rotating cylinders 72 having certain features and orientation (as discussed in more detail below) for urging the labels 16 away from the bottles 14 to fall below the separator into a vibrating filter 110, and for urging the delabeled bottles to be substantially de-watered and to travel down the separator 70 where they are transported for further processing.

Referring now to the invention in more detail, the washer 30 has a generally elongate, cylindrical shell or drum 36 defining a hollow interior space for co-axially housing a helical screw 40 fixed therewithin. A super structure 20 supports the drum 36 above a floor 22, and carries a drive mechanism 44 for rotating the drum about a longitudinal axis 42 in a pre-set manner to advance the drum's contents from the open inlet 32 to the open outlet 34 in the direction indicated (i.e. to the right in FIG. 1). The mechanism 44 drives a family of wheels 46 that travel along circumferential tracks 48 to spin the drum. A stationary hopper 50 is supported by the frame 20 at the drum's inlet 32 to introduce the mixture of labeled bottles 12, including contaminants such as bottle caps, cap rings, loose labels and dirt, into the drum to begin the cleaning and label release stage of the process. A measured amount of hot water is introduced at the chute through hot water piping 18 to initially wet the incoming labeled bottles and to facilitate the forward motion (i.e. rightward in FIG. 1) of the load. Steam is further introduced into the drum at selected spaced locations along the length of the drum through peripherally located steam injector nozzles 38. The steam is delivered to the nozzles at low pressure through a supply pipe 39 which communicates with a steam header 23 and steam boilers 24. In this embodiment the nozzles 38 are spaced about the same distance as the longitudinal gap between vanes of the helical screw 40, although such spacing may be varied depending on specific requirements. The steam is injected at low pressure into each "chamber" 41 of the screw to maintain a temperature that is high enough for cleaning the bottles and for effectively releasing labels from the bottles. The amount of steam injected into each chamber 41 of the drum can be independently regulated at each respective nozzle 38 so as to maintain a desired internal temperature gradient along the length of the drum to optimize cleaning and label release conditions. Further, the inside surface of the drum has corrugations 37 for enhancing agitation of the bottle mixture within.

Figure 2:
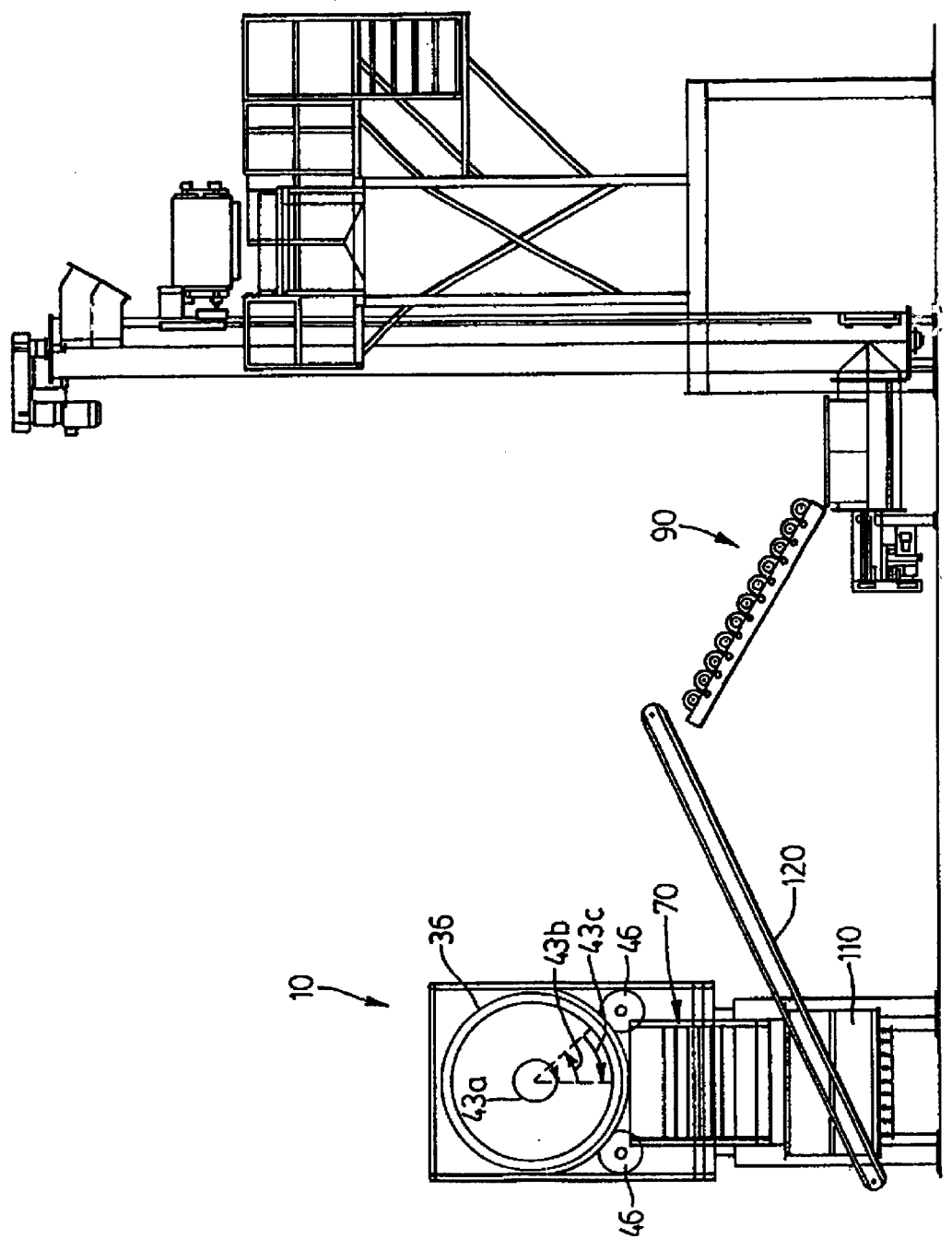
FIG. 2 is an end view from the right side of FIG. 1 showing the label separating apparatus in front of the washing apparatus.

The movement of the drum is designed to increase the retention, or residence, time for the bottles within the drum, and to further increase agitation of the bottles, while maintaining a fairly low rpm, namely under 2 rpm in the preferred embodiment, which may be adjusted as needed. The aim is to provide enough time and agitation to properly release labels and other contaminants from the bottles, yet not too much time to unduly slow down productivity. The drum movement is a combination of roll, or spin, and oscillation. A favourable sequence has been found to be one 45 degree oscillation for every full (i.e. 360 degree) revolution of the drum. Hence, referring to the end view of the drum in FIG. 2, for every 360 degree roll in a first direction indicated by 43a, the drum is then turned (i.e. "oscillated") 45 degrees in the opposite (second) direction and brought back 45 degrees in the first direction, as indicated by 43b and 43c, respectively. The cycle is then repeated. Each roll propels the load forwardly toward the outlet 34, and each oscillation promotes washing and label release. In the preferred embodiment the drum's movement provides a residence time of between 10 to 13.5 minutes on average.

Figures 3, 4:
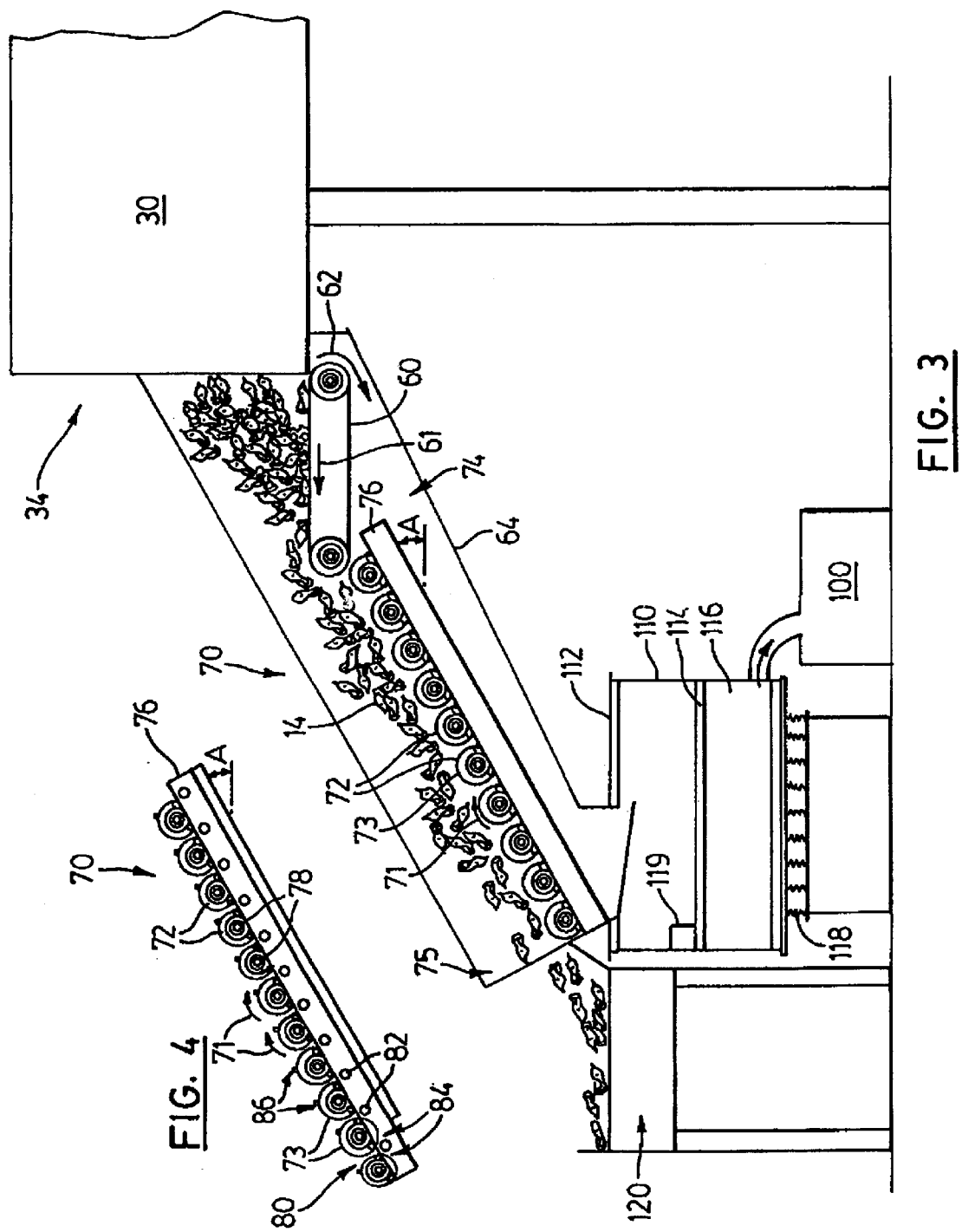
FIG. 3 is a close-up elevational view of the separation system, and in particular the label separating apparatus, downstream of the washing apparatus, shown from the right side of FIG. 2 (i.e. the mirror image of FIG. 1)
FIG. 4 is a partially transparent isolated view of the label separating apparatus of FIG. 3.
Figure 5:
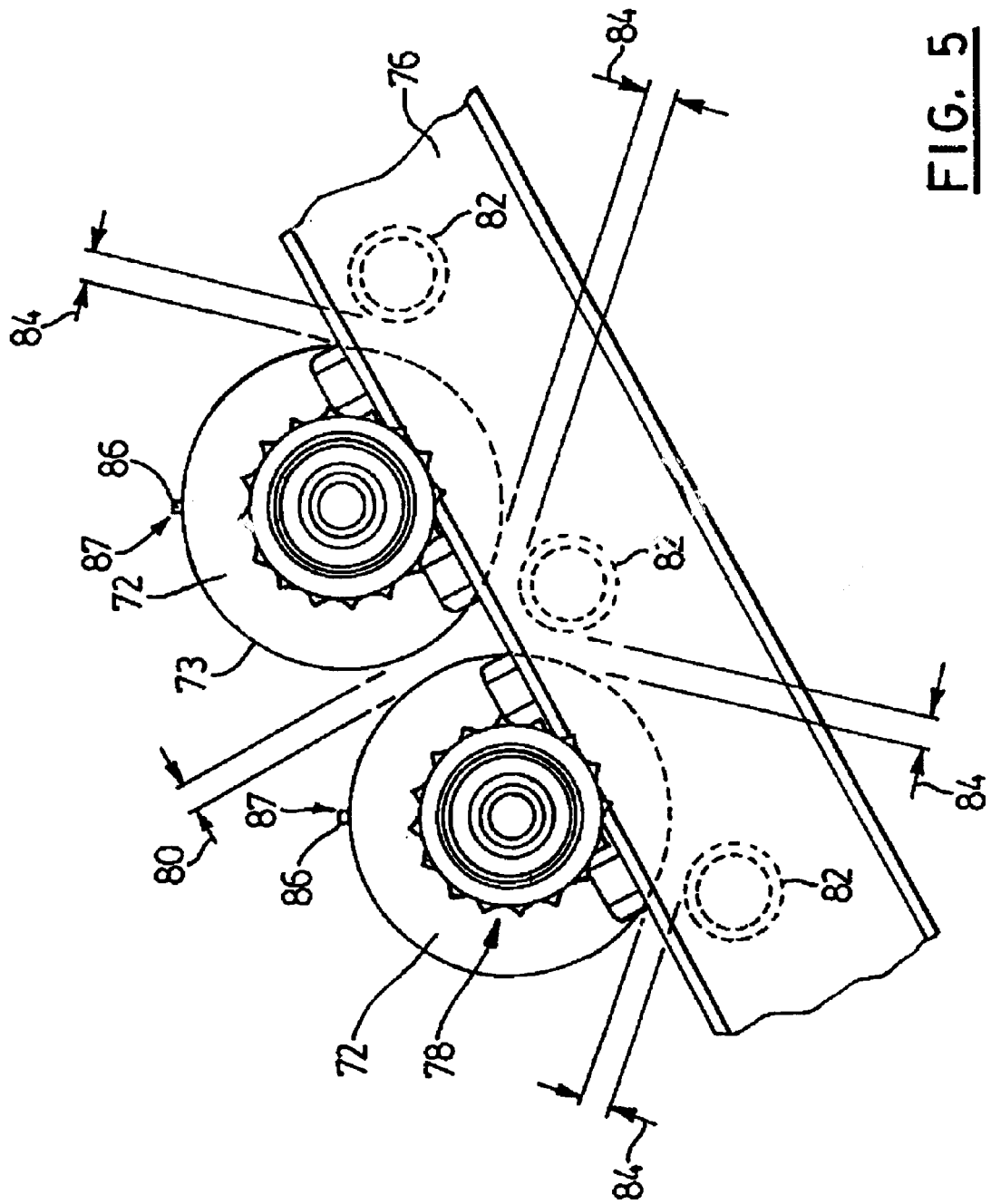
FIG. 5 is a broken out elevational view of a portion of the label separating apparatus of FIG. 4 in the area indicated by reference numeral 5; and, FIG. 6 is a plan view of the label separating apparatus of FIG. 3, including the drive mechanism for the apparatus.
Figure 6:
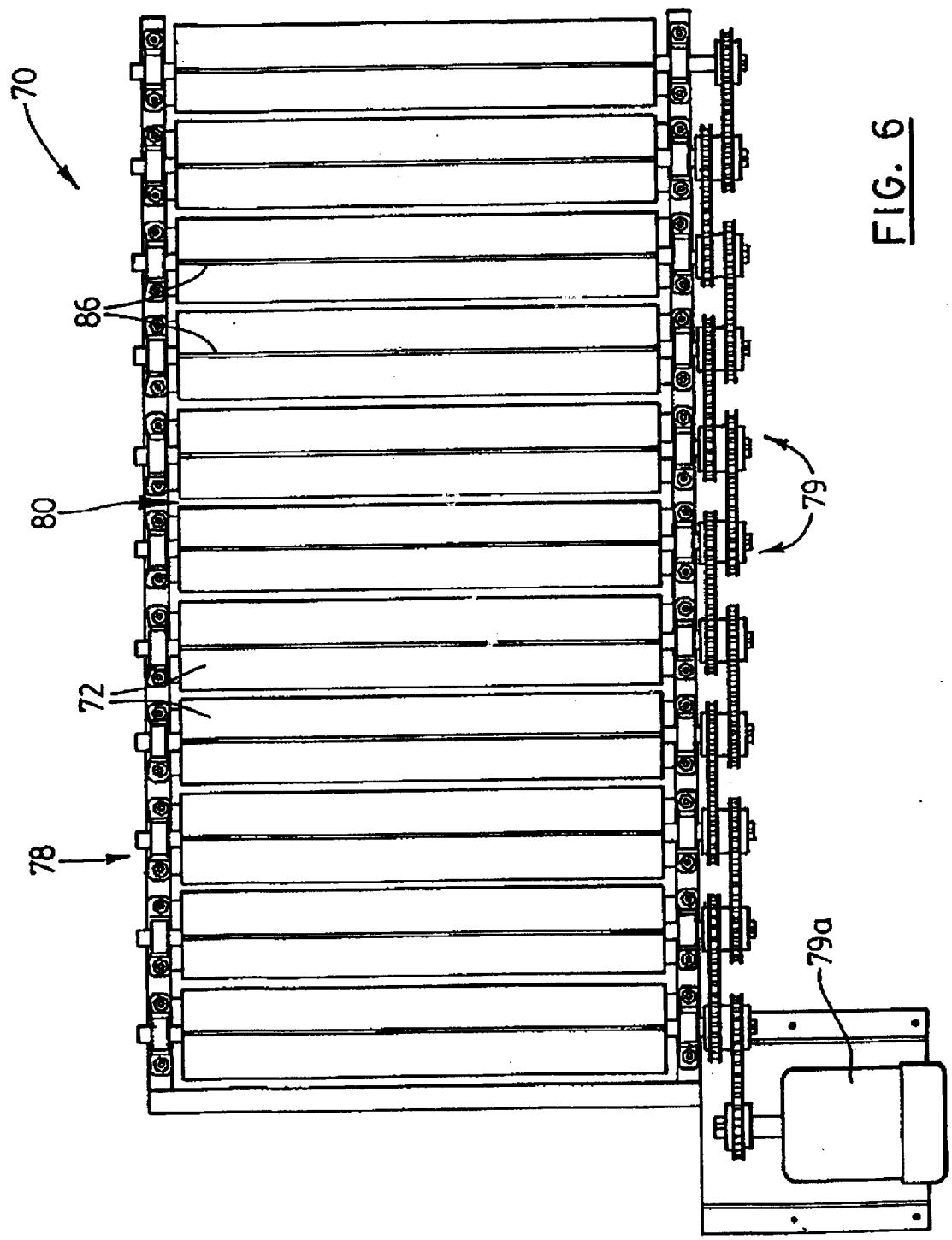

Upon each revolution of the drum a mixed load of labels 16, delabeled bottles 14, bottles with labels still clinging, water (including condensed steam) and other contaminants is expelled from the outlet 34 onto a first conveyor 60 for moving the load forward (in the direction of arrow 61) toward the separator 70. The conveyor 60 also serves to spread out the load into a more uniform stream before it reaches the separator 70. In particular, numerous chains (not shown) are suspended immediately above the conveyor belt across its width to contact and even out any mounds of bottles that are deposited from the washer. The conveyor 60 is also inclined to the rear (i.e. down to the left toward the outlet 34 in FIG. 1, where the incline is exaggerated) to drain the expelled water (as indicated by arrow 62 in FIG. 3) onto a forwardly inclined (i.e. downwardly to the left in FIG. 3) plate member 64. The plate member 64 channels the water, and any labels which might be caught up in the water, into a vibrating filter 110, whose function is described later. It is noted that in the drum of the present embodiment all of the hot water 18 and steam introduced into the drum is expelled from the outlet 34, and not at any intermediate point along the drum, to help with washing of labels down the plate 64 into the vibrating filter 110.

The first conveyor 60 discharges the wet bottle mixture onto the label separator 70, shown in greater detail in FIGS. 3 to 6, at its first, or higher, end 74. A second structure 21 supports the separator frame 76 inclined to the horizontal by an angle A, which in the preferred embodiment is set at about 29 degrees. The frame 76 carries a series of elongate steel cylinders, or rollers 72, oriented in parallel relationship, all of which are rotatably driven in the same direction on a bearing mechanism 78 by a drive mechanism 79, which includes a drive motor 79a. Each roller's longitudinal axis is preferably set horizontally and perpendicular to the line of travel of the bottles 14. Each roller 72 is driven counter to the prevailing movement of the bottles 14 along the separator, namely in the counter-rotating direction indicated by 71 (i.e. clockwise in FIGS. 3 and 4).

The separator has several important features. Firstly, a first gap 80 is provided between opposing outer surfaces 73 of each set of adjacent rollers to encourage some bottles to randomly jam or wedge between the rotating rollers. Elongate rods 82 are also fixed parallel to the rollers, namely one rod directly below each first gap at a perpendicular distance to form a second gap 84 from each roller to encourage the wedged bottles to remain in the first gap 80 for some time rather than being quickly pushed through the first gap. It has been found that a bottle typically stays wedged for up to several hours or days of operation until it gets so mutilated that it is pushed through the first and second gaps 80, 84 and falls onto the inclined plate 64 where it is urged by gravity and the expelled water 62 onto the vibrating filter 110, from where it may be removed by hand. The expelled bottle is eventually replaced by another bottle 14 as it passes across the separator 70 and gets wedged between the rollers. In the preferred embodiment where plastic pop bottles of various shapes and sizes are processed, it has been found that optimal first and second gaps 80 and 84 are each about 0.75 inch (19 mm), within a range of about 0.25 inch (6 mm).

A second important feature is the fixing, as by welding, of at least one solid metal bar 86, or "scraper", to the surface 73 of each roller 72 in a substantially longitudinal direction across most or all of the width of the roller. Although in alternate embodiments of the invention the bar 86 may be placed on one or more selected rollers, it is preferred that each roller have at least one bar thereon. The bar should be small enough to pass through both gaps 80 and 84, and to pass by another bar from an adjacent roller should both bars enter the first gap 80 simultaneously. The bars 86 help perform a "self cleaning" function, namely as the bars pass through the first gap 80 the bars help push through (i.e. clear) any labels and contaminants that have fallen in the vicinity, which then fall through the second gap 84 and onto the inclined plate 64. These labels and contaminants are urged down the plate by gravity and the expelled water 62 onto the vibrating filter 110. The bars 86 also fulfill other related functions, such as impacting the bottles 14 on the separator to help dislodge any labels and contaminants that are mixed in with the bottles to provide the labels with an opportunity to fall onto the rollers 72, and to help scrape away labels which adhere to the wedged bottles between the rollers. Hence, it is desireable that the bars 86 have fairly sharp edges 87 to enhance performance of the above noted functions. As the edges of a bar become blunt and reduce its effectiveness, the bar is either replaced with a new bar having "sharp" corners, or the new bar is merely welded onto the roller's surface 73 a distance from the old blunt bar. A 0.25 inch (6 mm) square bar has functioned desireably in the preferred embodiment, although other polygonal cross-sections may also be effective. The bars may also be made integral with the manufacture of the rollers if desired.

A third important feature is the incline of the separator 70 and the counter-rotation of the rollers 72. The counter-rotating rollers, and in particular the bars 86 on the rollers, strike the bottles 14 and cause them to bounce into the air, which allows the labels and is bottles to separate, and urges de-watering. While the bottles are being bounced around, the denser (i.e. wet) labels fall onto the rollers and are urged through the gaps 80, 84 toward the vibrating screen below. The incline of the separator allows gravity to advance the bottles to the separator's second, or lower, end 76 where the delabeled bottles bounce onto a second conveyor 120 for further processing. The separator's incline should be great enough to allow gravity to advance the bottles from the first to second ends 74, 75, but shallow enough to allow the bottles to contact as many rollers as possible. If the angle is too great, then the bottle/label mixture will arrive too quickly at the second end 75 and allow too many labels to continue on the second conveyor, thus decreasing the effectiveness of the label separator. If the angle is too shallow, then the bottles will not advance toward the second end 75, causing a backlog. Hence, the angle must be such that the bottles are advanced at an acceptable rate while being provided with enough "retention time" to optimize separation of the labels from the bottles. It has been found that an angle A of about 29 degrees from the horizontal provides very good results.

It will be appreciated that the bottle retention time on the label separator 70 impacts on the efficiency of label separation. A greater retention time is preferable over a shorter one to ensure that the labels have adequate time and opportunity to encounter the rollers and be pushed below the separator. One manner of increasing retention time would be to extend the separator's frame 76 and add more rollers, or to place two label separators 70 in series. In the present embodiment very good results have been achieved using 10 sequentially placed rollers 72. Whereas it appears that prior art label removing devices which employ rotating meshes have a separation rate of about 80% (i.e. 20% of labels are not removed as desired and continue on with the delabeled bottles), the label separator of the present invention should achieve a separation rate in excess of 90%, and has been found to achieve separation rates in the range of 99%. It will also be appreciated that the size of the gaps, and in particular of the first gap 80, may have to be altered depending on the types of bottles, materials or products being processed. For example, the first gap may have to be increased for 4 liter (or 1 gallon) plastic milk jugs due to their greater dimensions than plastic pop bottles, so as to encourage favourable wedging of such larger bottles between the rollers.

Once the removed labels 16 fall through the second gaps 84 onto the inclined plate 64, expelled water 62 from the washer 30 moves the wet labels through the open top 112 of a drum-like vibrating filter 110, and onto a surface formed by a screen 114. The expelled water falls by gravity through the screen 114 into the chamber 116 from where it is channeled to the hot water tank 100 for re-use. The drum 110 sits on a mechanism 116 which vibrates the filter in such a manner as to urge more water to separate from the labels, and to advance the labels toward an exit point 119 from where the labels are carried to a compactor for other use. The reclaimed hot water in the tank 100 is recirculated via piping 18 to the chute 50 for re-use e in the washer 30. It is noted that the steam header 23 also communicates with the tank 100 through piping 104 so that any excess condensed steam is re-used in the system.

The operation and many advantages of the present invention may now be better understood. To summarize the process, a mixture of raw bottles (i.e. with labels attached), including bottle caps, cap rings, loose labels and dirt, indicated by 12, are fed into the washer drum 36 at its feed end 32, and hot water is pumped in from the water feed 18 to facilitate the forward motion of the mixture through the drum. As the washer is rotated and the fixed helical screw 40 within moves the mixture forward, steam is injected into the drum to maintain a temperature sufficiently high to clean the bottles and to release the labels from the bottles. The drum is also oscillated between each full rotation to agitate the mixture and promote washing and label liberation. Unlike prior art systems, the introduced water (including the steam and the condensed steam), travels the length of the drum to its outlet 34. The water, steam and movement of the drum result in the release of labels 16 from the now substantially "delabeled" bottles 14. Although many of the labels fall from the bottles, some remain on the bottles, albeit in a loosened state. Not all labels need to be released from the bottles upon exiting the outlet end 34 since the next stage, namely the label separator 70, should complete the task of removing the labels and other contaminants from the bottles. The mixture of bottles, water, labels and contaminants exiting the drum next encounters the first conveyor 60 which allows water to be expelled from the mixture into the hot water tank 100, via the filter 110, for re-use.

The first conveyor 60 helps spread out the load before it is dropped onto the first end 74 of the separator 70. The separator essentially separates the labels 16 and other contaminants (i.e. caps, cap rings and dirt) from the mixture to provide a supply of cleaned and delabeled plastic bottles 14. The separation is accomplished by passing the mixture onto the series of counter-rotating rollers 72 mounted to the frame inclined at 29 degrees to the horizontal. The rollers, including the bars 86 fixed thereto, cause the bottles to bounce and flip, thus urging any still-attached labels to peel off and water removal from inside the bottles. The loose labels and other contaminants fall into the first gap 80 between the rollers, and either fall through to the inclined plate 64 below or are pushed through by the bars 86 as they pass by the first gaps. The separator is designed to have some bottles jammed in the first gaps to aid in the separation of labels and contaminants, and in scraping labels adhering to the roller surfaces. The fixed rods 82 typically help retain the jammed bottles in the first gap for as long as several hours or days, since it is undesireable to have a large volume of bottles escaping into the vibrating filter below. The delabeled bottles 14 that proceed by gravity to the separator's lower end 75 are carried away, as by conveyor belt 120, for further processing, namely sorting according to colour, type of plastic, shredding and pelletization. The water, labels and contaminants that fall from the separator into the vibrating filter 110 are further separated by the filter so that the water is channeled to the hot water tank 100 where the water may be re-heated for re-use at the inlet 32 of the washer. The labels 16 are separated by the vibrating filter and packaged for further use.

In addition to the advantages already mentioned, the present invention requires little supervision, maintenance and shut-down time for cleaning and removal of paper/plastic jams. In fact, certain jams, such as the plastic bottle jams in the first gaps 80 of the label separator 70, are incorporated into the invention to aid rather than hinder in the processing of the bottles. Hence, down-time is minimized and 24 hour operation is made possible.

The present system does not require large volumes of water to process the bottles and pass them through. The screw mechanism is adapted to push the bottles through the washer 30 with little water, and gravity (not water) moves the bottles along the label separator 70. Very good results have been achieved using 35 to 40 gpm (gallons per minute) of hot water input at chute 50, in combination with about 1.33 rpm of the washer 30 (i.e. 1 full rotation and 1 complete oscillation of the drum every 45 seconds).

The present process has been found to handle between 4000 to 8000 lbs. (about 1800–3600 kg.) of raw material (i.e. mixture of bottles and contaminants) per hour, resulting in less than 10% of bottles having unremoved contaminants. Hence, with such a high percentage (i.e. over 90%) of delabeled bottles in the exit stream from the label separator 70, it facilitates the implementation of a secondary process for removing any remaining contaminants, as for example the addition of a second label separator 90 after the first separator 70 (shown at the end of the second conveyor 120 in FIG. 2).

The present invention minimizes the loss of bottles to the separated label stream entering the vibrating filter 110 due to the very restricted openings provided by the first and second gaps 80, 84. Hence, very few bottles end up on the vibrating filter 110, thus avoiding the cost of extra personnel for sorting out bottles from the separated labels.

The present invention avoids any extra steps for removing water from within the cleaned bottles. The bouncing and flipping action of the delabeled bottles 14 across the label separator 70 urges removal of such water from the bottles.

The present invention also avoids the use of chemicals in the delabeling process. Optionally, however, a liquid other than just heated water may be employed if required for removal of certain labels and/or glues. For instance, the liquid may include water as a base for carrying certain chemicals, or may avoid water all together and instead use a mixture of chemicals.

Yet another advatage is that, in an alternate embodiment of the invention, the washer may be run without any hot water input. Rather, the hot water is substituted with a greater volume of steam injected into the drum at high pressure. Advantages of this variant include the ability to effectively process a greater volume of bottles in the same drum, and little if any water is introduced into the bottles, thus avoiding the need to extract introduced water out of the bottles at the label separation stage. The temperature of the steam may also be regulated above 100 degrees Celsius (212 degrees Fahrenheit) for optimal label release.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below.

We claim:

1. A system for releasing and separating labels from containers comprising:
   a release portion for mixing said containers with an introduced fluid and for providing said containers with a sufficient retention time and agitation to clean said containers and release said labels therefrom; and,
   a separation portion for receiving said containers and labels from said release portion, said separation portion comprising a plurality of rollers adapted to urge said labels and introduced fluid away from said containers.

2. The system of claim 1 wherein said introduced fluid includes steam injected at intervals into said release portion to maintain a desired temperature gradient.

3. The system of claim 2 wherein said temperature gradient is within a temperature range high enough for cleaning said containers and for urging the release of said labels therefrom.

4. The system of claim 2 wherein said introduced fluid further includes a measured amount of liquid added to said release portion to wet said containers and facilitate movement of said containers and labels therethrough.

5. The system of claim 4 wherein said liquid comprises heated water.

6. The system of claim 1 wherein said release portion comprises an elongate drum adapted to rotate about a longitudinal axis, said drum housing a screw member for urging said containers therethrough.

7. The system of claim 6 wherein said rotation comprises a combination of revolution of said drum to propel said containers through said drum, and oscillation of said drum to provide additional agitation and wasting of said containers and to promote label release.

8. The system of claim 7 wherein said rotation is under 2 rpm.

9. The system of claim 7 wherein said oscillation is provided for every 360 degree revolution of said drum, said oscillation comprising a first turn of said drum in a direction opposite to said revolution and then a second turn in the same direction as said revolution.

10. The system of claim 9 wherein said first and second turns each comprise a 45 degree rotation of said drum.

11. The system of claim 6 wherein an inside surface of said drum defines a plurality of corrugations for enhancing agitation of said containers.

12. The system of claim 1 wherein said rollers are driven in a counter-rotating manner to the prevailing movement of said containers along said rollers.

13. The system of claim 12 wherein said rollers form an inclined plane over which said containers are urged to travel by gravity.

14. The system of claim 13 wherein said rollers are aligned in a generally parallel relationship to define a first gap between opposing surfaces of adjacent rollers to encourage wedging of some of said containers between said rollers.

15. The system of claim 14 further including a means for urging said containers wedged between said rollers to remain in said respective first gaps.

16. The system of claim 15 wherein said means for urging comprises an elongate rod member fixed below each of said first gaps parallel to said rollers.

17. The system of claim 1 wherein at least one of said rollers includes a scraping means for dislodging and scraping labels away from said containers.

18. The system of claim 17 wherein said scraping means comprises an elongate bar of polygonal cross-section secured to an outer surface of said at least one roller.

19. The system of claim 14 wherein at least one of said rollers includes a scraping means for dislodging and scraping labels away from said containers and for pushing labels through a respective first gap.

20. The system of claim 19 wherein said scraping means comprises an elongate bar of polygonal cross-section secured to an outer surface of said at least one roller and of sufficient size to pass through said respective first gap.

21. An apparatus having a releaser and separator for removing labels from a stream of containers wherein said releaser comprises a rotatable hollow drum member housing a helical screw member for urging said containers through said drum member and for mixing said containers with fluids introduced therein, said drum member being adapted to provide said containers with adequate retention time and agitation to clean said containers of contaminants and release said labels therefrom, wherein rotation of said drum member comprises revolution of said drum member to propel said containers therethrough and oscillation of said drum member to provide additional agitation and washing of said containers and to promote label release.

22. The apparatus of claim 21 wherein said fluids comprise steam injected into said drum member at selected intervals therealong.

23. The apparatus of claim 22 wherein said drum includes nozzle means at said selected intervals to individually regulate the volume of steam being injected for maintaining a desired temperature gradient within said drum member.

24. The apparatus of claim 22 wherein said fluids include heated water added at an inlet end of said drum member to wet said containers and to facilitate movement of said containers, labels and contaminants through said drum member.

25. The apparatus of claim 21 wherein said oscillation is provided for every 360 degree revolution of said drum member, said oscillation comprising at least one turn of said drum in a direction opposite to said revolution and at least one other turn in the same direction as said revolution.

26. The apparatus of claim 25 wherein an inside surface of said drum member defines a plurality of corrugations for enhancing agitation of said containers.

27. The apparatus of claim 21 wherein an inside surface of said drum member defines a plurality of corrugations for enhancing agitation of said containers.

28. An apparatus having a releaser and separator for removing labels and fluids from a stream of containers wherein said separator comprises a plurality of driven rollers adapted to urge said labels and fluids away from said containers, said rollers forming an inclined plane wherein the incline of said plane is sufficient to urge said containers to travel thereover by gravity.

29. The apparatus of claim 28 wherein said rollers are driven in a counter-rotating manner to the prevailing movement of said containers along said rollers.

30. The apparatus of claim 29 wherein said incline is about 29 degrees to the horizontal.

31. The apparatus of claim 28 wherein said rollers are aligned in a generally parallel relationship to define a first gap between opposing surfaces of adjacent rollers to encourage wedging of some of said containers between said rollers.

32. The apparatus of claim 31 wherein said separator includes a means for urging said wedged containers to remain in said first gaps.

33. The apparatus of claim 32 wherein said means for urging comprises an elongate rod located below each of said first gaps parallel to said rollers.

34. The apparatus of claim 33 wherein each of said rods forms a second gap with an adjacent roller to allow labels passing through a respective first gap to fall away from said separator for further processing.

35. The apparatus of claim 28 wherein at least one of said rollers has at least one scraper for dislodging and scraping labels from said containers.

36. The apparatus of claim 35 wherein said scraper comprises an elongate bar of polygonal cross-section mounted to a surface of said at least one roller.

37. The apparatus of claim 31 wherein at least one of said rollers has at least one scraper for dislodging and scraping labels from said containers.

38. The apparatus of claim 37 wherein said scraper comprises an elongate bar of polygonal cross-section mounted to a surface of said at least one roller.

39. A method for removing labels from containers comprising:
   feeding a plurality of said containers into an upstream end of a releaser;
   introducing fluids into said releaser;
   maintaining a temperature within said releaser sufficient for cleaning said containers and for urging the release of said labels therefrom;
   revolving said releaser to propel said containers and labels toward a downstream end of said releaser;
   oscillating said releaser to provide sufficient retention time and agitation for washing said containers and promoting label release;
   discharging said containers, labels and fluids from said downstream end of said releaser toward a first end of a separator;
   passing said discharged containers and labels onto a plurality of driven rollers of said separator;
   urging said containers to travel by gravity over said rollers by maintaining said separator inclined; and,
   discharging said labels from said separator in a first direction and discharging said containers from said separator in a second direction for further processing.

40. The method of claim 39 wherein said introducing of fluids into said releaser includes injecting steam at spaced intervals into said releaser.

41. The method of claim 40 wherein said injecting comprises regulating the volume of steam being injected at each interval for maintaining a desired temperature gradient in said releaser.

42. The method of claim 40 wherein said introducing of fluids into said releaser includes adding heated liquid at said upstream end of said releaser to wet said containers and to facilitate movement of said containers and labels through said releaser.

43. The method of claim 39 wherein said introducing of fluids into said releaser includes adding heated liquid at said upstream end of said releaser to wet said containers and to facilitate movement of said containers and labels through said releaser.

44. The method of claim 39 wherein said oscillation is provided for every 360 degree revolution of said releaser, said oscillation comprising at least one turn of said releaser in a direction opposite to said revolution and at least one other turn in the same direction as said revolution.

45. The method of claim 39 further comprising maintaining said separator at an incline of about 29 degrees from the horizontal.

46. The method of claim 39 further comprising aligning said rollers in a generally parallel relationship to define a first gap between opposing surfaces of adjacent rollers to encourage wedging of some of said containers between said rollers.

47. The method of claim 46 further comprising adding an elongate member below each of said first gaps parallel to said rollers for urging said wedged containers to remain in said first gaps.

48. The method of claim 39 further including driving said rollers in a counter-rotating manner to the prevailing travel of said containers along said rollers for urging said labels away from said containers.

49. The method of claim 48 wherein said urging of said labels away from said containers further includes mounting at least one scraper of polygonal cross-section to a surface of at least one of said rollers.

* * * * *